United States Patent
Kubota

(10) Patent No.: US 7,149,355 B2
(45) Date of Patent: Dec. 12, 2006

(54) IMAGE PROCESSING APPARATUS, IMAGE PROCESSING METHOD, IMAGE PROCESSING PROGRAM, AND COMPUTER-READABLE RECORD MEDIUM STORING IMAGE PROCESSING PROGRAM

(75) Inventor: Satoshi Kubota, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 707 days.

(21) Appl. No.: 10/360,874

(22) Filed: Feb. 10, 2003

(65) Prior Publication Data

US 2003/0179935 A1    Sep. 25, 2003

(30) Foreign Application Priority Data

Mar. 19, 2002  (JP) ............................. 2002-076896

(51) Int. Cl.
G06K 9/48 (2006.01)
(52) U.S. Cl. ...................... 382/199; 382/203; 382/266; 382/300
(58) Field of Classification Search ................ 348/452; 358/447, 451; 382/203, 299, 300, 199, 266, 382/274
See application file for complete search history.

(56) References Cited

U.S. PATENT DOCUMENTS

| | | | |
|---|---|---|---|
| 5,138,443 A | | 8/1992 | Ikeda et al. |
| 5,161,035 A | * | 11/1992 | Muramatsu ................. 358/451 |
| 6,415,053 B1 | * | 7/2002 | Norimatsu ................... 382/199 |
| 6,535,651 B1 | * | 3/2003 | Aoyama et al. ............. 382/300 |
| 6,766,068 B1 | * | 7/2004 | Aoyama et al. ............. 382/300 |
| 6,980,254 B1 | * | 12/2005 | Nishihashi et al. ......... 348/452 |
| 2003/0179935 A1 | * | 9/2003 | Kubota ........................ 382/199 |
| 2005/0157940 A1 | * | 7/2005 | Hosoda et al. .............. 382/266 |

FOREIGN PATENT DOCUMENTS

| | | |
|---|---|---|
| EP | 0 497 537 A2 | 8/1992 |
| EP | 1054350 A1 * | 11/2000 |
| EP | 1347410 A2 * | 9/2003 |
| JP | A 7-182503 | 7/1995 |
| JP | A 09-098282 | 4/1997 |
| JP | A 09-326921 | 12/1997 |
| JP | A 2000-228723 | 8/2000 |
| JP | A 2000-253238 | 9/2000 |
| JP | A 2001-160139 | 6/2001 |

OTHER PUBLICATIONS

Dube et al., "An Adaptive Algorithm for Image Resolution Enhancement," Signals, Systems and Computers, 2000, *IEEE*, vol. 2, Oct. 29, 2000. pp. 1731-1734.

* cited by examiner

*Primary Examiner*—Gregory Desire
(74) *Attorney, Agent, or Firm*—Oliff & Berridge, PLC

(57) ABSTRACT

An image processing apparatus has an edge direction estimation section for estimating edge direction information for a first image area containing a notable pixel, an edge pattern selection section for selecting an edge shape pattern corresponding to the first image area corresponding to a predetermined edge direction estimated based on the edge direction information and pixel values in the first image area containing the notable pixel, an image enhancement section for enhancing the pixel values of the first image area containing the notable pixel, an enlarged image block generation section for generating an enlarged image area using the selected edge shape pattern and the enhanced pixel values of the first image area, and an image block placement section for placing the enlarged image area generated by the enlarged image block generation section according to a predetermined method.

19 Claims, 23 Drawing Sheets

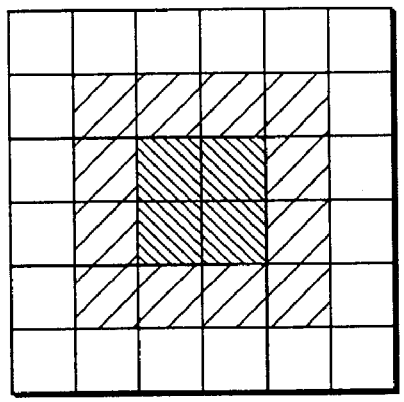
FIG. 3A
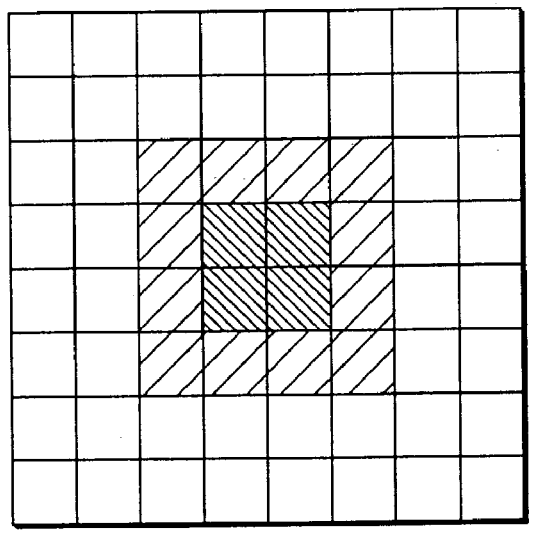
FIG. 3B
 NOTABLE AREA
 PERIPHERAL AREA

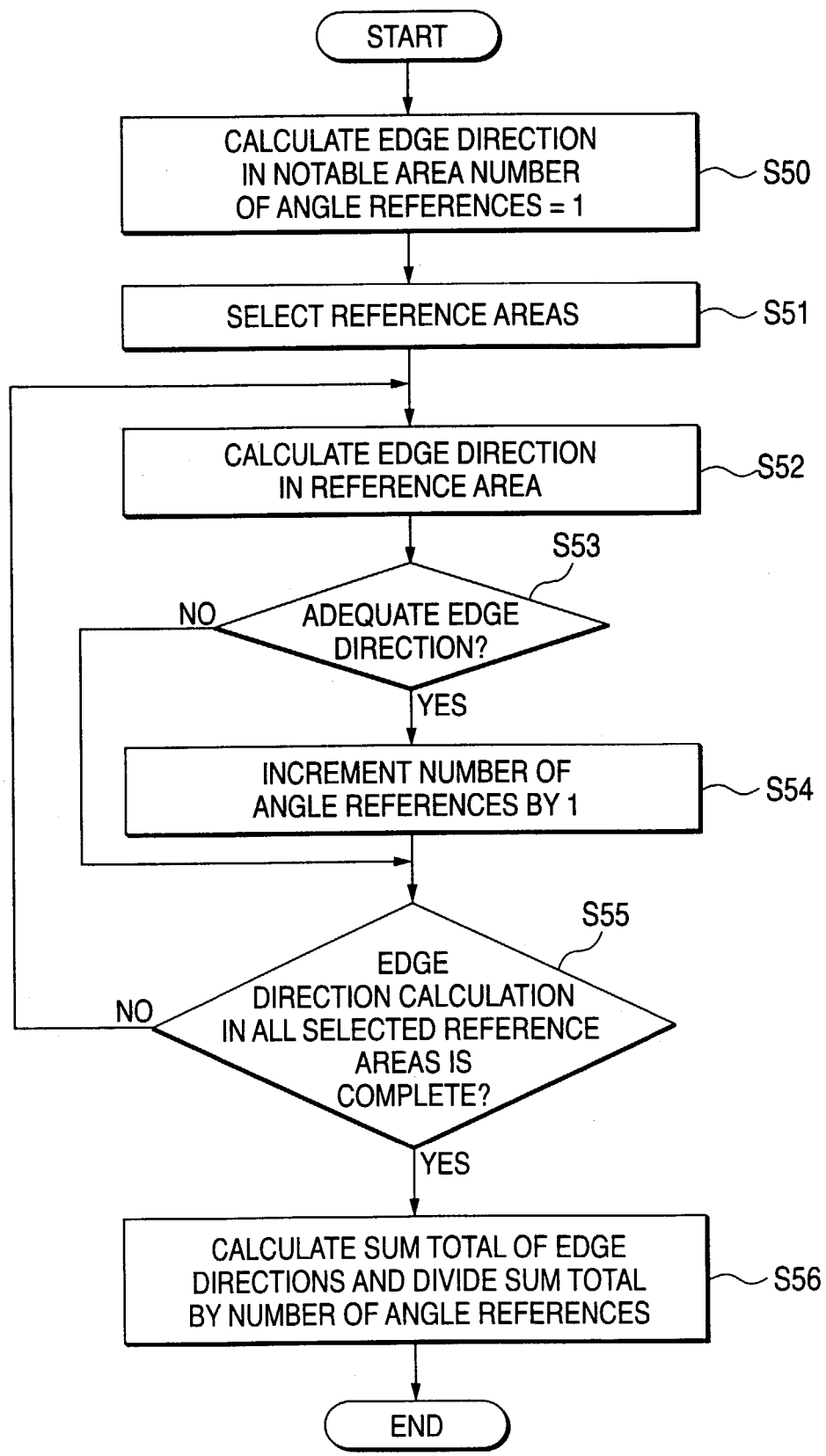

WHEN EDGE DIRECTION IN NOTABLE AREA IS NORMALIZED DIRECTION 0

NUMBER OF REFERENCE AREAS, 2

WHEN EDGE DIRECTION IN NOTABLE AREA IS NORMALIZED DIRECTION 4

NUMBER OF REFERENCE AREAS, 2

WHEN EDGE DIRECTION IN NOTABLE AREA IS NOT NORMALIZED DIRECTION 0 OR 4

NUMBER OF REFERENCE AREAS, 4

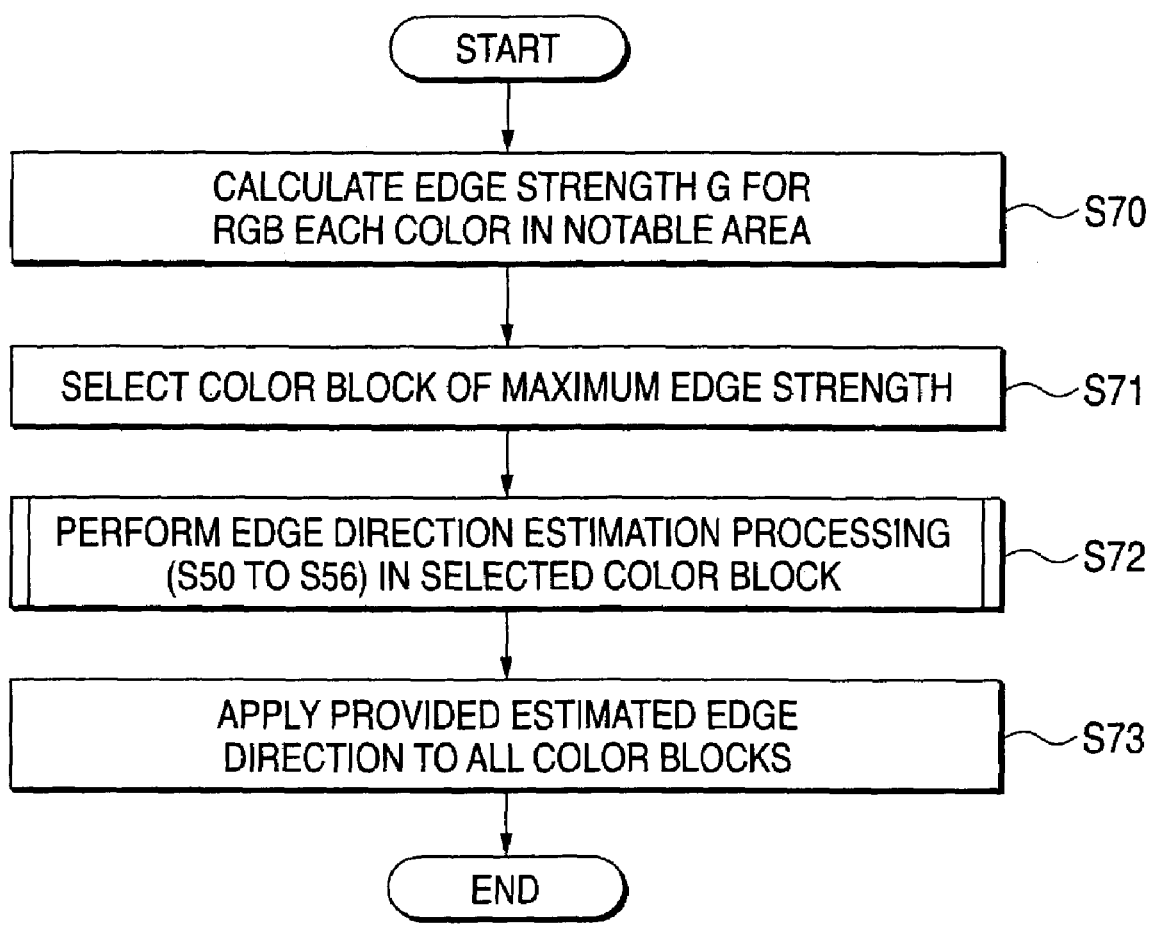

FIG. 9

FIG. 10A
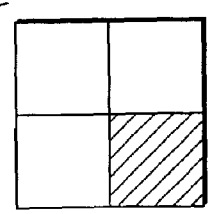
PATTERN 0
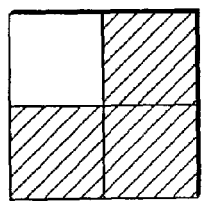
PATTERN 1
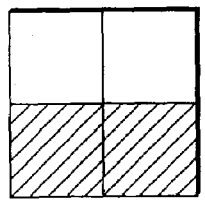
PATTERN 2
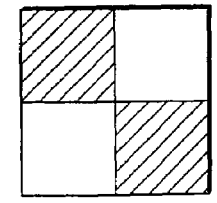
PATTERN 3
FIRST EDGE PATTERNS
FIG. 10B
1000
1110
1010
1001
BIT PATTERNS
FIG. 10C
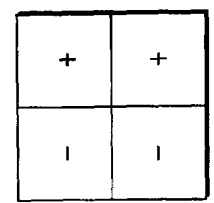
PIXEL VALUE PATTERN OF NOTABLE AREA
FIG. 10D
1010
BIT PATTERN OF NOTABLE AREA
FIG. 10E
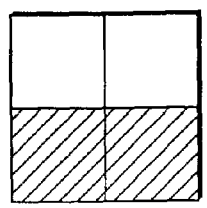
SELECTED PATTERN (PATTERN 2)

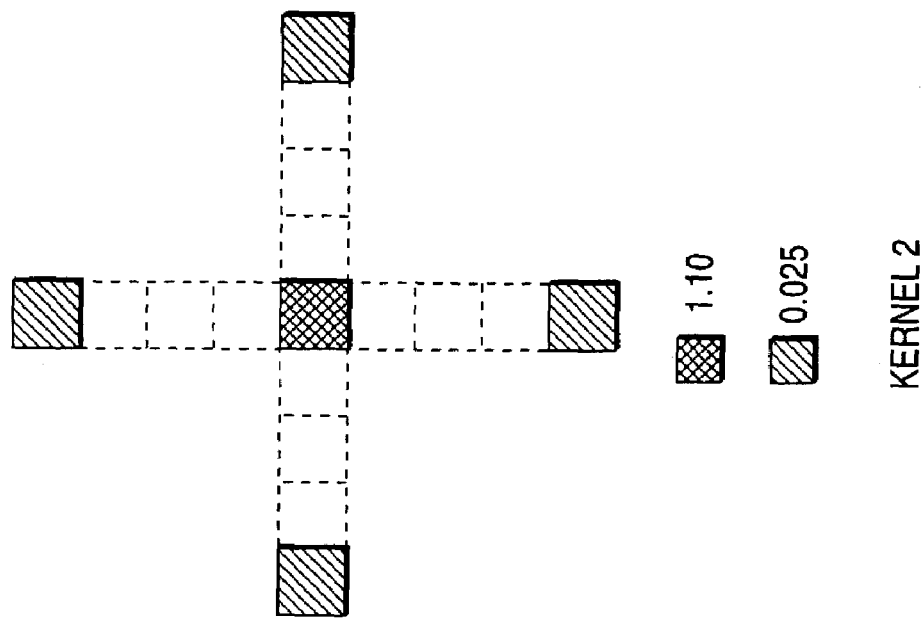
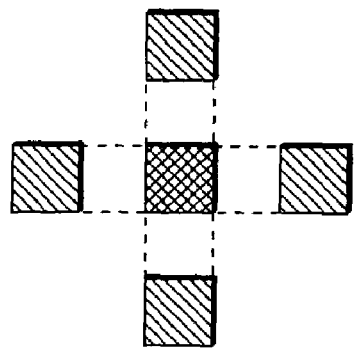
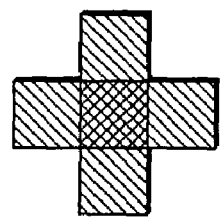

FIG. 16
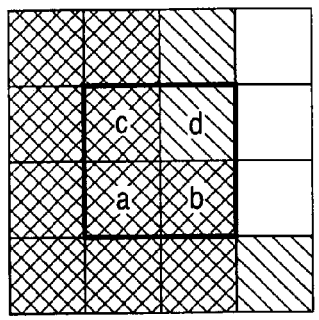
NOTABLE AREA
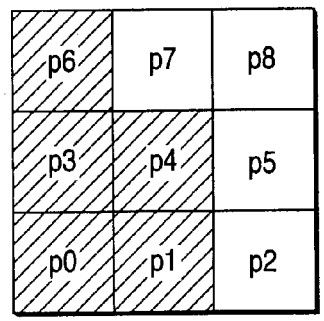
SECOND EDGE PATTERN
$p0 = a$
$p1 = (a + c)/2$
$p2 = b$
$p3 = (a + c)/2$
$p4 = (b + c)/2$
$p5 = (b + d)/2$
$p6 = c$
$p7 = (b + d)/2$
$p8 = d$
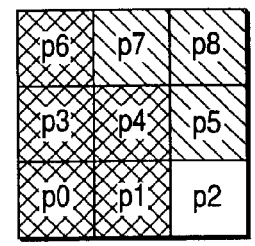
3 x 3 ENLARGED
IMAGE BLOCK FIG. 17
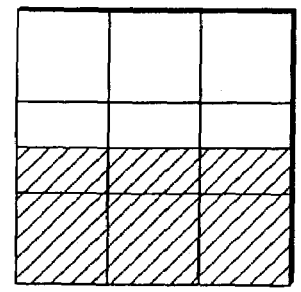
p0 = a
p1 = (a + b)/2
p2 = b
p3 = (a + c)/2
p5 = (b + d)/2
p6 = c
p7 = (c + d)/2
p8 = d
p4 = (p1 + p7)/2
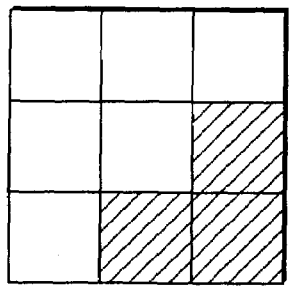
p0 = a
p1 = a
p2 = b
p3 = a
p4 = (b + c)/2
p5 = (b + d)/2
p6 = c
p7 = (c + d)/2
p8 = d
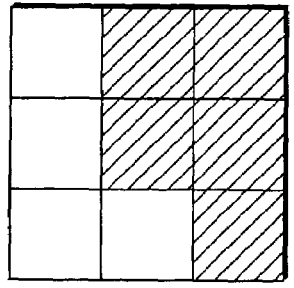
p0 = a
p1 = (a + b)/2
p2 = b
p3 = (c + d)/2
p4 = (a + b)/2
p5 = (a + b)/2
p6 = c
p7 = (c + d)/2
p8 = d
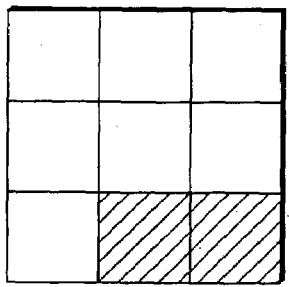
p0 = a
p2 = b
p3 = (a + c)/2
p4 = (b + c)/2
p5 = (b + d)/2
p6 = c
p7 = (c + d)/2
p8 = d
p1 = 2*p4 - p7

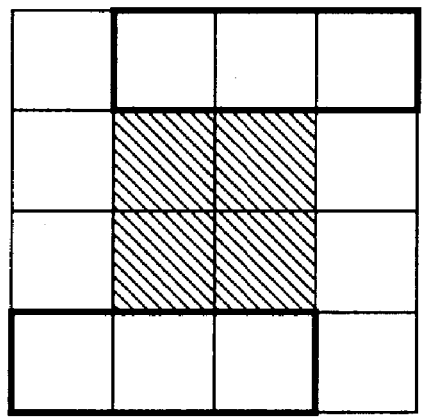 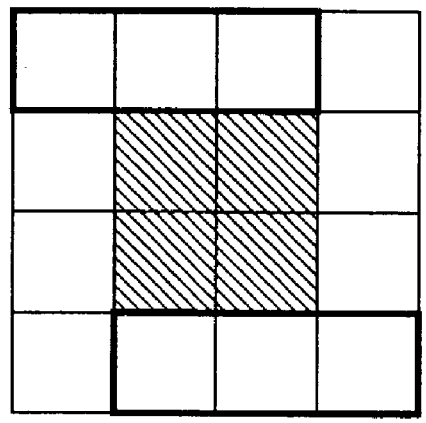
REFERENCE PIXELS WHEN ESTIMATED EDGE DIRECTION IN NOTABLE AREA IS ANY OF DIRECTION 1 (22.5°) TO DIRECTION 3 (67.5°)
REFERENCE PIXELS WHEN ESTIMATED EDGE DIRECTION IN NOTABLE AREA IS ANY OF DIRECTION 5 (112.5°) TO DIRECTION 7 (157.5°)
FIG. 19

NOTABLE AREA        ENLARGED IMAGE BLOCK

IMAGE PROCESSING APPARATUS, IMAGE PROCESSING METHOD, IMAGE PROCESSING PROGRAM, AND COMPUTER-READABLE RECORD MEDIUM STORING IMAGE PROCESSING PROGRAM

The present disclosure relates to the subject matter contained in Japanese Patent Application No. 2002-076896 filed on Mar. 19, 2002, which is incorporated herein by reference in its entirety.

BACKGROUND OF THE INVENTION

1. Field of the Invention

This invention is intended for enlargement processing of an image represented with a multi-step gradation and relates in particular to an image processing apparatus, an image processing method, an image processing program, and a computer-readable record medium storing the image processing program for suppressing occurrence of image quality defects of blurring and jaggies, in an input image and performing enlargement processing of the image with high quality.

2. Description of the Related Art

Image enlargement processing is one type of basic processing for a system for editing, filing, displaying, and printing, images. In recent years, with the widespread of image data mainly intended for display at a monitor display resolution to view an Internet web site or a digital video, high-quality enlargement processing has been becoming important increasingly to produce the high-quality output result in printing the low-resolution images on a high-resolution printer.

Nearest neighbor method, linear interpolation or bilinear method, and cubic convolution method are available as existing techniques of performing enlargement processing of an image represented with a multi-step gradation, which will be hereinafter referred to as a multilevel image.

The nearest neighbor method is a method of using as each pixel value after enlargement, the pixel value of the nearest pixel when each pixel is inversely mapped onto the original image. The nearest neighbor method can be processed at high speed since it involves small computation amount, but one pixel of the original image is enlarged intact to a rectangular shape. Thus, jaggies occur in an oblique line portion or if the magnification is large, the image becomes mosaic; the degree of image quality degradation is large.

The linear interpolation or bilinear method is a method of assuming that the pixel value between pixels changes linearly, and linearly interpolating the pixel values of four nearby pixels of the inverse map point of pixel after enlargement to find the pixel value. The linear interpolation or bilinear method involves heavier processing load than the nearest neighbor, but involves comparatively small computation amount and jaggies occur less. On the other hand, the linear interpolation or bilinear method has disadvantage in that the whole image becomes blurred centering on the edge portions not applied to the assumption of linear change.

The cubic convolution method is a method of defining an interpolation function approximating a sinc function (sin(x)/x) based on a sampling theorem and performing convolution of 16 nearby pixels of the inverse map point of pixel after enlargement (four by four pixels in the X and Y direction) and the approximate interpolation function to find the pixel value after enlargement. This method provides comparatively good image quality as compared with the two techniques described above, but involves a large reference range and large computation amount and has a characteristic of high-frequency enhancement. Thus, the cubic convolution has disadvantages in that light jaggies occur in the edge portions and the noise component is enhanced.

As attempts to solve the problems, techniques are proposed in JP-A-7-182503, JP-A-2000-228723, JP-A-2000-253238, "Tekioutekina nijigen hyouhonka kansuu niyoru kouhinshituna gazoukakudaisaikousei" (Gazou Denshi Gakkaishi Vol. 28 No. 5 P.P. 620–626).

In JP-A-7-182503, the maximum value and the minimum value are detected from pixels of an N×M area (for example, 3×3) surrounding a notable pixel and further contrast and an intermediate value are calculated and based on the contrast, either the maximum value or the minimum value and an average value of other values are derived as representative values. Next, linear interpolation or bilinear processing of the notable pixel to N×M pixels is performed, binarization is executed with the calculated intermediate value as a threshold value, and the two representative values are placed according to the result of the binarization. If the contrast is small, the pixel values of the linear interpolation or bilinear processing are used intact, whereby a final enlarged image is provided.

Accordingly, no jaggies occur and good conversion with no interpolation blurring even in a natural image is possible. However, there is a problem that the edge parts are determined based only on the contrast and that it is difficult to reproduce edges directions. There is also a problem that block-like distortion occurs in the edge part since the N×M area is made up of two values only.

In JP-A-2000-228723, an original image is binarized, and from the binary image, the direction of an oblique component contained in the original image is found by making a match determination with a provided two-dimensional pattern (matrix data), and interpolation processing is found along the found oblique direction. In other portions, linear interpolation or bilinear processing is performed.

Since the original image is binarized according to a predetermined threshold value before the direction determination of the oblique component is made, the method is effective for edges with large density difference, but involves a problem in reproducing edges with small density difference.

In JP-A-2000-253238, linear interpolation or bilinear processing is performed for an original image to enlarge the original image and in parallel, each surrounding N×M area containing a notable pixel in the original image is binarized, and a match determination with a preset oblique line detection pattern is made. If the notable pixel belongs to an edge area (matches the oblique line detection pattern), its direction information is mapped to the notable pixel. Further, the direction information is mapped to the enlarged image provided by performing the linear interpolation or bilinear processing, and smoothing filtering along the direction of the mapped direction information is performed, whereby enlargement processing with jaggy occurrence suppressed is performed.

However, the technique described in JP-A-2000-253238 is a sequence of enlargement of the original image, pattern matching, enlargement of the direction information, and direction-dependent smoothing filtering for the enlarged image, so that the technique involves a problem of the processing load becoming very large as the image size becomes large.

In the cubic convolution, an error is caused by using an approximation function with the sinc function discarded finitely because the sinc function is an infinite series, and the sampling theorem aims at continuous and differentiable signals; whereas the art described in "Tekioutekina nijigen hyouhonka kansuu niyoru kouhinshituna gazoukakudaisaikousei" (Gazou Denshi Gakkaishi Vol. 28 No. 5 P.P. 620–626) introduces the fact that an image contains a large number of discontinuous points as a problem, uses a function fitted for discontinuity and having locality, different from the sinc function as an interpolation function, detects the edge direction globally, and deforming the interpolation function in the detected edge direction, thereby providing an enlarged image with less occurrence of blurring and jaggies.

The function used in the technique is local, but the convolution matrix size becomes 4n relative to magnification n and the edge direction is detected globally and thus there is a problem of a large computation amount.

SUMMARY OF THE INVENTION

It is therefore an object of the invention to provide an image processing apparatus, an image processing method, an image processing program, and a computer-readable record medium storing the image processing program for making it possible to provide an enlarged image with less occurrence of blurring and jaggies under small processing load at high speed.

According to the invention, edge direction information is estimated for a first image area containing a notable pixel, an edge shape pattern corresponding to the first image area corresponding to a predetermined edge direction estimated is selected based on the edge direction information and pixel values in the first image area containing the notable pixel, and the pixel values of the first image area containing the notable pixel are enhanced. An enlarged image area is generated using the selected edge shape pattern and the enhanced pixel values of the first image area, and the enlarged image area is placed according to a predetermined method.

In the invention, edge direction information is estimated for the first image area containing the notable pixel, an edge shape pattern corresponding to the first image area corresponding to a predetermined edge direction estimated is selected based on the edge direction information and the pixel values in the first image area containing the notable pixel, so that it is made possible to determine the edge shape pattern corresponding to the edge direction only by executing simple pattern matching. Further, the pixel values of the first image area containing the notable pixel are enhanced, an enlarged image area is generated using the selected edge shape pattern and the enhanced pixel values of the first image area, and the enlarged image area is placed according to the predetermined method, so that it is made possible to generate an enlarged image considering the edge direction and provide an enlarged image with less occurrence of blurring and jaggies under small processing load at high speed.

BRIEF DESCRIPTION OF THE DRAWINGS

FIGS. 3A and 3B are drawings to show examples of image blocks extracted by an image block setting section and notable areas and peripheral areas;

FIG. 5 is a flowchart to show a flow of edge direction estimation processing of an edge direction estimation section;

FIG. 7 is a flowchart to show a flow of edge direction estimation processing for an RGB color space color image in the edge direction estimation section;

FIG. 9 is a drawing to show a specific example of an edge pattern table;

FIGS. 10A to 10E are drawings to specifically describe a method of selecting a first edge pattern for the notable area in FIG. 4;

FIGS. 12A to 12C are drawings to show specific examples of enhancement kernels used with an image enhancement section;

FIG. 16 is a drawing to show a specific example of 3×3 enlarged image block generation;

FIG. 17 is a drawing to show an example of 3×3 enlarged image block generation using a second edge pattern different from the second edge pattern in FIG. 16;

FIG. 19 is a drawing to describe selection of reference pixels according to estimated edge direction;

DETAILED DESCRIPTION OF THE PREFERRED EMBODIMENTS

Figure 1:
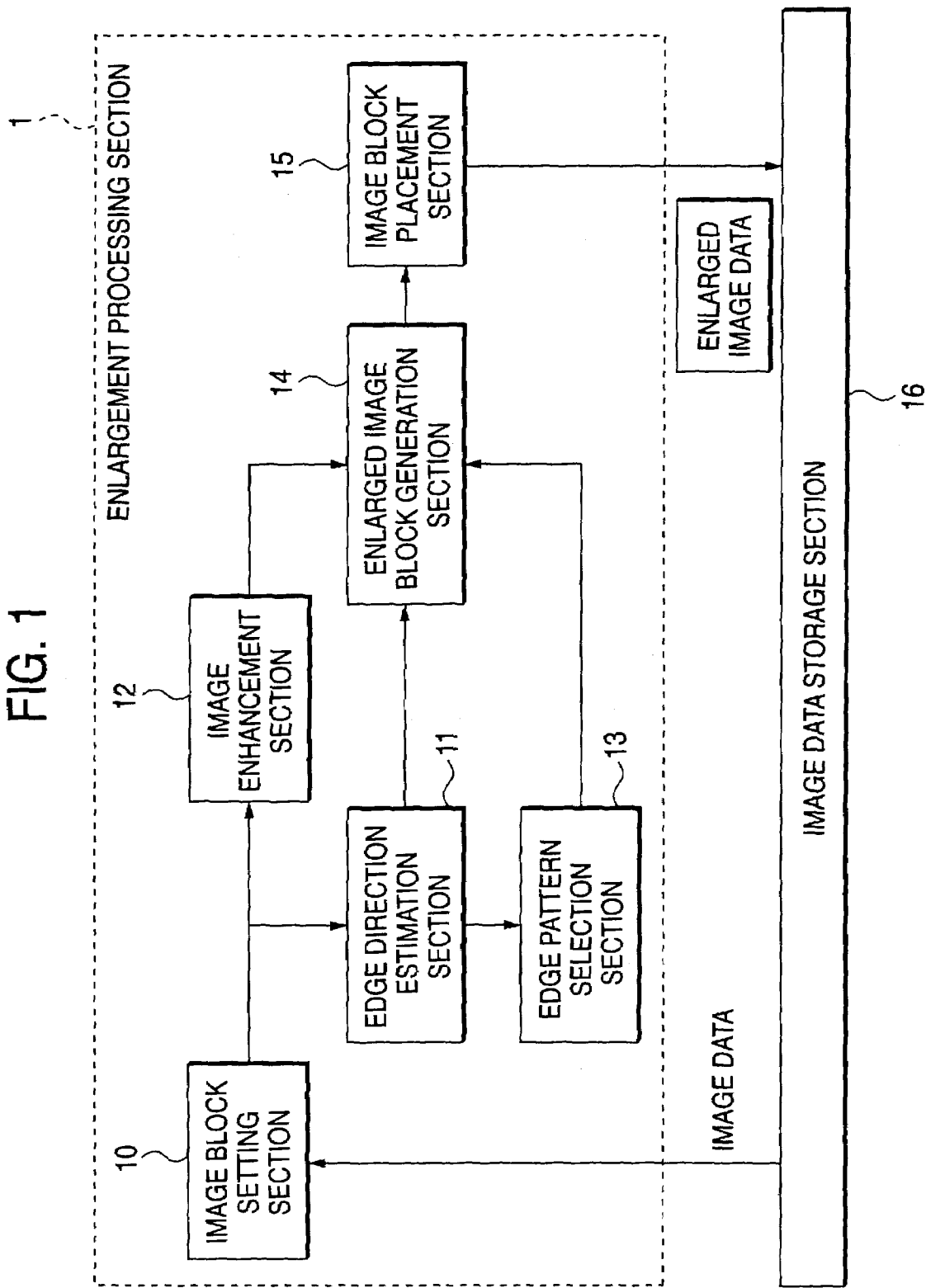
FIG. 1 is a block diagram to show the basic configuration of an embodiment of the invention.

Referring now to the accompanying drawings, there are shown preferred embodiments of the invention. FIG. 1 is a block diagram to show a processing section for performing enlargement processing of an image processing apparatus according to an embodiment of the invention. In the figure, an enlargement processing section 1 is made up of an image block setting section 10, an edge direction estimation section 11, an image enhancement section 12, an edge pattern selection section 13, an enlarged image block generation section 14, an image block placement section 15, and an image data storage section 16. An outline of the components of the embodiment and the operation thereof will be discussed.

In FIG. 1, image data is described in an image format that can be processed in the image processing apparatus (for example, BMP, TIFF, PNG) and is generated from image data prepared in an application program for performing processing of creation and editing, in a image processing machines such as personal computer, or a digital camera (not shown).

The image data storage section 16 comprises a function of temporarily storing image data input from an input unit (not shown) until the image data undergoes enlargement processing in the enlargement processing section 1, a function of temporarily storing enlarged image data subjected to resolution conversion or enlargement processing until the enlarged image data is output to an output unit (not shown).

The image block setting section 10 comprises a function of setting each block size required for processing of the edge direction estimation section 11 and the image enhancement section 12, extracting image blocks of the block size in order from the input image data stored in the image data storage section 16, and transmitting the image block to the edge direction estimation section 11 and the image enhancement section 12.

The edge direction estimation section 11 comprises a function of calculating edge directions in a notable area in each of the image blocks extracted in order by the image block setting section 10 and a reference area on the periphery of the notable area from the pixel value distribution of each area and estimating the edge direction of the notable area from the edge directions calculated in the areas.

The image enhancement section 12 comprises a function of enhancing the contrast of the image data in the notable area in each of the image blocks extracted by the image block setting section 10 and the peripheral area of the notable area using the kernel of elements and the size responsive to the enlargement ratio of enlargement processing in the enlargement processing section 1.

The edge pattern selection section 13 comprises a function of selecting a first edge pattern of the same size as the notable area corresponding to the edge direction of the notable area estimated by the edge direction estimation section 11 and specifies a second edge pattern of a different size from the first edge pattern, the first and second edge patterns being provided in a one-to-one correspondence with each other.

The enlarged image block generation section 14 comprises a function of generating an enlarged image block for the notable area using the edge direction estimated by the edge direction estimation section 11, the second edge pattern provided by the edge pattern selection section 13, and the contrast-enhanced pixel values provided by the image enhancement section 12.

The image block placement section 15 comprises a function of placing the enlarged image blocks output from the enlarged image block generation section 14 in order and outputting the image data subjected to resolution conversion and enlargement to the image data storage section 16.

Figure 2:
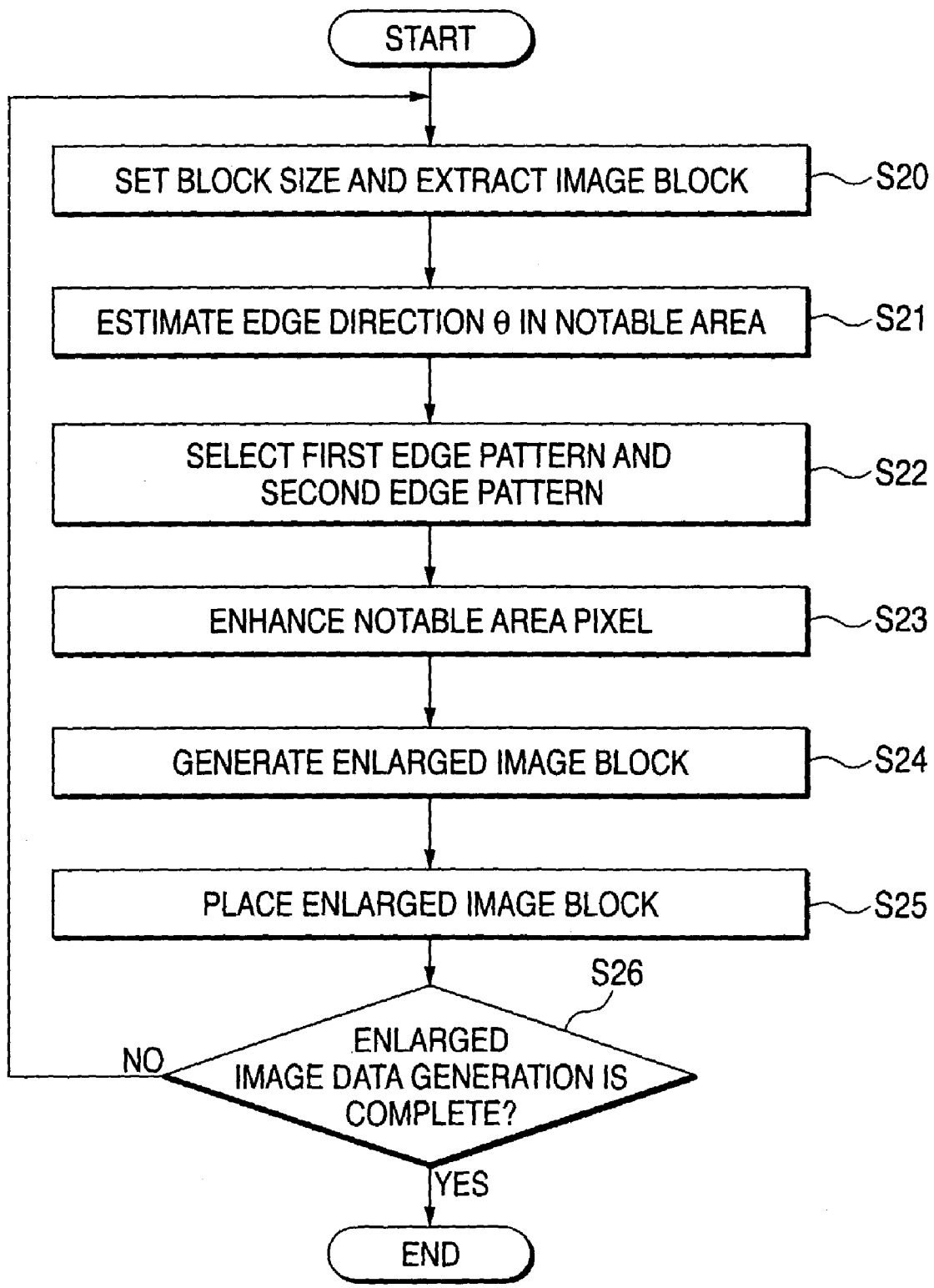
FIG. 2 is a flowchart to show a processing flow of the embodiment of the invention.

Next, an outline of a flow of the enlargement processing in the embodiment of the invention will be discussed with reference to a flowchart of FIG. 2. In the description to follow, for reference numerals not shown in FIG. 2, FIG. 1 is referenced.

To being with, at step S20, the image block setting section 10 sets each block size required for processing of the edge direction estimation section 11 and the image enhancement section 12 for the input image data from the input unit (not shown) and stored the image data storage section 16, and extracts the image block of the block size from the input image data.

If the notable area is of 2×2 size and the peripheral area containing the notable area is of 4×4 size, for example, as shown in FIG. 3, 6×6 size block shown in FIG. 3A is extracted for twice enlargement; 8×8 size block shown in FIG. 3B is extracted for four-time enlargement.

Next, at step S21, the edge direction estimation section 11 calculates the edge directions of the notable area in the extracted image block and the reference area in the peripheral area containing the notable area and estimates edge direction Θ of the notable area from the provided edge directions.

Next, at step S22, the edge pattern selection section 13 selects first and second edge patterns using the edge direction Θ estimated by the edge direction estimation section 11 and a pixel distribution pattern of the notable area. The first and second edge patterns are provided for each edge pattern and each pixel distribution pattern described later, and are stored in a storage section (not shown in FIG. 1), in a form such as table information.

Subsequently, as step S23, the image enhancement section 12 enhances the image data in the notable area and its peripheral area in the image block extracted by the image block setting section 10 using the kernel having the element values and the size responsive to the enlargement ratio.

Next, at step S24, the enlarged image block generation section 14 generates an enlarged image block for the notable area using the edge direction Θ in the notable area estimated by the edge direction estimation section 11, the edge pattern selected by the edge pattern selection section 13, and the pixel values of the notable area and the peripheral area enhanced by the image enhancement section 12.

Then, at step S25, the image block placement section 15 places the enlarged image blocks for the notable area, generated by the enlarged image block generation section 14 in order according to a predetermined method described later and stores the placed image blocks in the image data storage section 16.

At step S26, whether or not generation of the enlarged image data to be output relative to the input image data is complete is determined. If the generation of the enlarged image data is not complete, the process is returned to step S20 and another image block is extracted and the above-described processing is repeated. If the generation of the enlarged image data is complete, the enlarged image data is output and the enlargement processing is terminated.

The outline and the operation of the image processing apparatus in the embodiment of the invention have been described. Then, the edge direction estimation section 11, the image enhancement section 12, the edge pattern selection section 13, the enlarged image block generation section 14, and the image block placement section 15 of the main part of the image processing apparatus will be discussed in detail.

Edge direction estimation of the edge direction estimation section 11 of the embodiment will be discussed in detail by taking as an example the case where the notable area is a 2×2 size area and the peripheral area containing the notable area is a 4×4 size block as previously shown in FIG. 3.

Figure 4A:
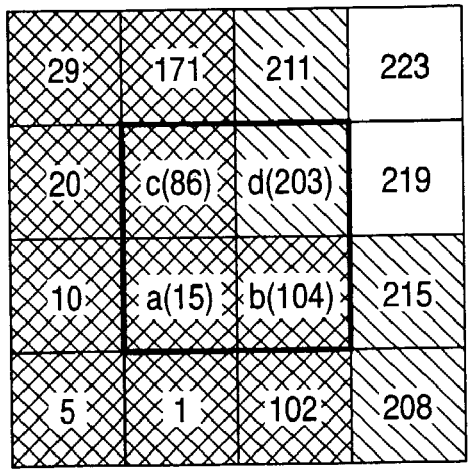
FIGS. 4A and 4B are drawings to describe specific examples of notable areas and peripheral areas and edge directions in notable area.

FIG. 4A is a drawing to show an example of the notable area and the peripheral area. In FIG. 4, the notable area is pixels $\{a, b, c, d\} = \{15, 177, 86, 203\}$ surrounded by a frame and the numerals indicate the pixel values. A flow of edge direction estimation processing of the edge direction estimation section 11 will be discussed with reference to a flowchart of FIG. 5.

To begin with, at step S50, the edge direction Θ in the notable block surrounded by the thick frame in FIG. 4 is calculated according to the following expression (1). The number of angle references, a variable for counting the number of edge angle references used for edge direction estimation of the notable area at step S55 described later, is set to 1.

$$gx=(a+c-b-d)/2$$

$$gy=(a+b-c-d)/2$$

$$\Theta=\arctan(gy/gx) \tag{1}$$

Figure 4B:
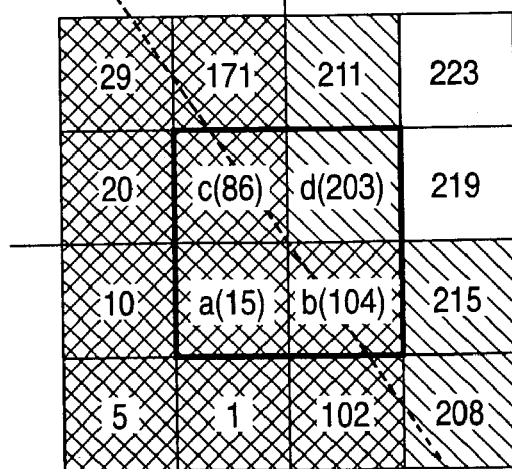

For example, for the notable area {15, 104, 86, 203} specifically as shown in FIG. 4A, gx=−103 and gy=−85 from expression (1) and the edge direction Θ in the notable area shown in FIG. 4A becomes equal to −140.5°. Further, as shown in FIG. 4B, if the found edge direction Θ is normalized at 22.5° (eight directions), direction 2 results when Θ=−145.2°.

Next, at step S51, reference areas used for edge direction estimation are selected from within the peripheral area shown in FIG. 4A in response to the edge direction Θ in the notable area calculated at step S50.

Figure 6A:
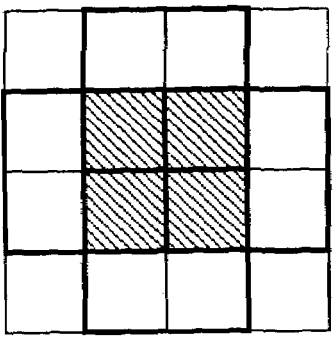
FIGS. 6A to 6C are drawings to show examples of reference areas used for edge direction estimation.
Figure 6B:
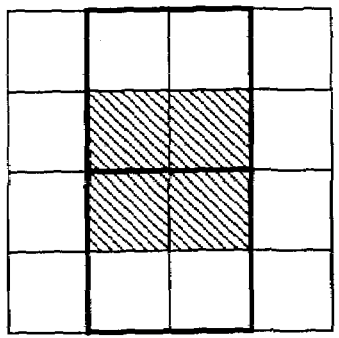
Figure 6C:
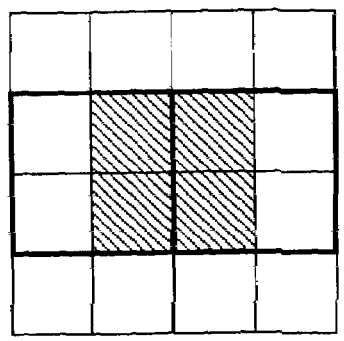

FIGS. 6A to 6C shows examples of reference area selection based on the edge direction in the notable area. For the notable area, the normalized edge direction is direction 2 and thus four reference areas shown in FIG. 6C (four areas of up and down and left and right 2×2 containing the notable area) are selected. Reference area selection is not limited to that shown in FIG. 6. For example, in FIG. 6C, eight reference areas (eight areas of up and down and left and right and slanting 2×2 containing the notable area) may be used.

Next, at step S52, for each reference area selected at step S51, the edge direction Θ is calculated according to expression (1) as at step S50.

Then, at step S53, a comparison is made between the edge direction in the selected reference area calculated at step S52 and the edge direction in the notable area calculated at step S50.

If the difference between both the edge directions is smaller than a preset threshold value Th, the number of angle references is incremented by one at step S54 and the process is transferred to step S55. If the difference between both the edge directions is larger than the preset threshold value Th, it is determined that the reference area is not adequate for edge direction estimation, and the process is transferred to step S55.

Next, at step S55, whether or not edge direction calculation in all selected reference areas is complete is determined. If the edge direction calculation is complete, the process is transferred to step S56; if the edge direction calculation is not yet complete, steps S52 to S54 are repeated.

At step S56, the sum total of the edge direction in the notable area and the edge directions in the reference areas determined to be adequate for edge direction estimation at step S53 is calculated, and the average edge direction resulting from dividing the sum total of the edge directions by the number of angle references is adopted as the estimated edge direction in the notable area.

Thus, the edge direction in the notable area is estimated also considering the edge directions in the reference areas derived from the edge direction calculated only in the notable area, so that it is made possible to conduct edge direction detection with high accuracy only by performing easy calculation.

The case where the input image data is gray scale image in the edge direction estimation section 11 is described. However, this invention is not limited in use of a gray scale image. By way of example, a flow of edge direction estimation processing for an RGB color space color image will be discussed with reference to a flowchart of FIG. 7.

To begin with, at step S70, using the above-mentioned expression (1) and the following expression (2), edge strength G is calculated for each of RGB color space blocks in a notable area:

$$G=gx*gx+gy*gy \tag{2}$$

Next, at step S71, the maximum edge strength is selected from among the edge strengths of the RGB color space blocks calculated according to expression (2) and the color space block corresponding to the selected maximum edge strength is selected.

Next, at step S72, steps S50 to S56 of the edge direction estimation processing previously described with reference to FIG. 5 are executed in the color space block selected at step S71.

Then, at step S73, the estimated edge direction in the color space block of the maximum edge strength is adopted as the estimated edge direction in other color space blocks, and processing of the edge pattern selection section 13 and the enlarged image block generation section 14 described later is performed for each color space block.

As steps S70 to S73 are executed, it is made possible to suppress the image quality degradation causes such as a color shift in each edge part of enlarged image data in a color image.

The embodiment has been described assuming that normalization after edge direction calculation using expression (1) in notable and reference areas is eight directions, but this invention is not limited to the embodiment. If higher-accuracy edge directions are required, normalization may be conducted to 12 directions (15.0°), or 16 directions (12.25°).

Next, the operation of the edge pattern selection section 13 will be discussed in detail. The edge pattern selection section 13 uses an edge pattern table, for example, as shown in FIG. 9, to select the first edge pattern corresponding to the edge direction in the notable area estimated by the edge direction estimation section 11 and determine the second edge pattern corresponding to the selected first edge pattern.

Figure 8:
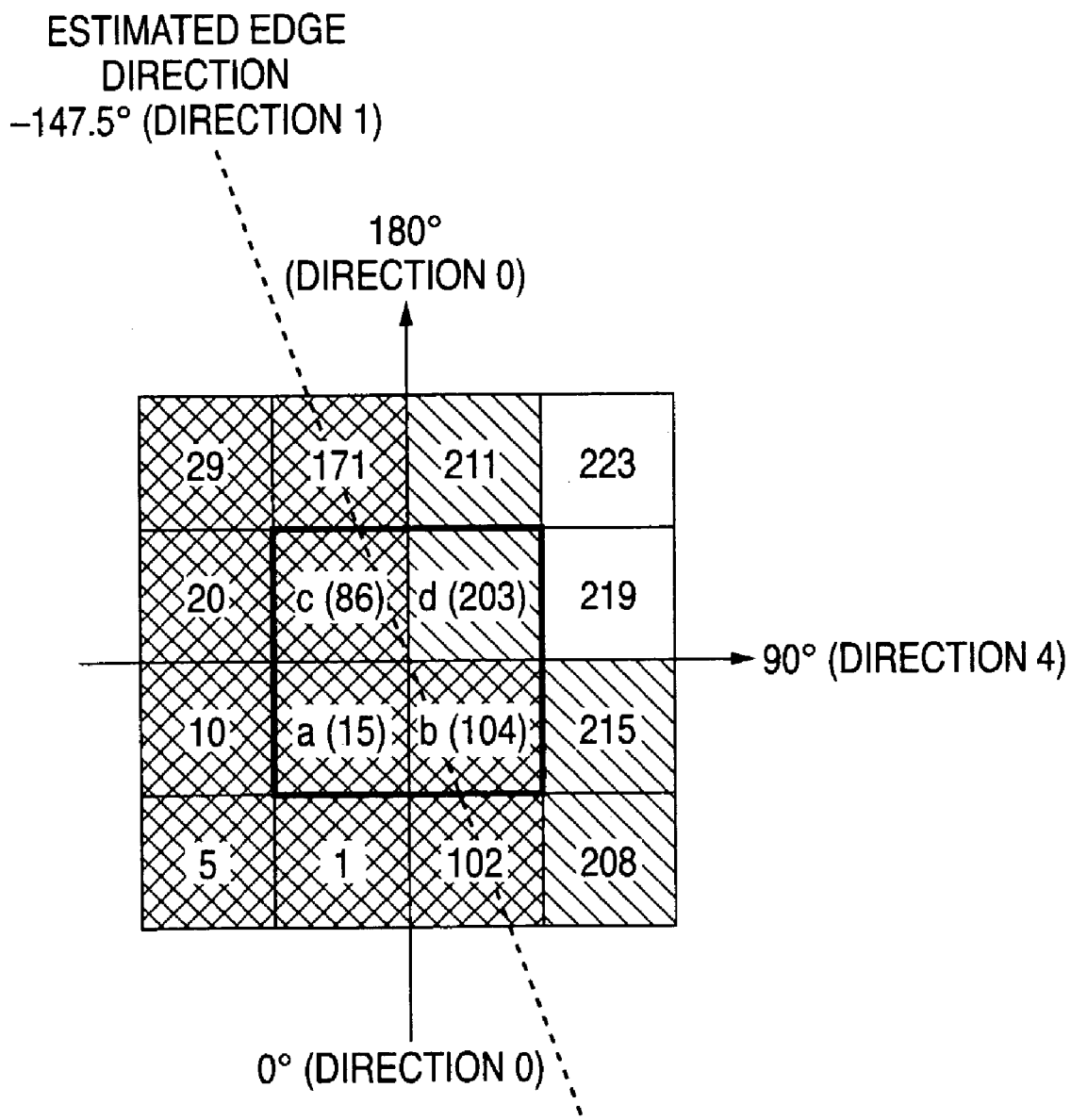
FIG. 8 is a drawing to show an estimated edge direction in the notable area in FIG. 4.

Specifically, as shown in FIG. 4A, the notable area surrounded by the frame and the peripheral area of the notable area are used in the description to follow. The estimated edge direction for the notable area shown in FIG. 4A is estimated to be direction 1 as shown in FIG. 8 according to processing steps of the edge direction estimation section 11 described above (sum total of edge directions in notable area and four reference areas (−737.3)/number of angle references (5)=−147.5, normalized edge direction 1).

Figure 9:
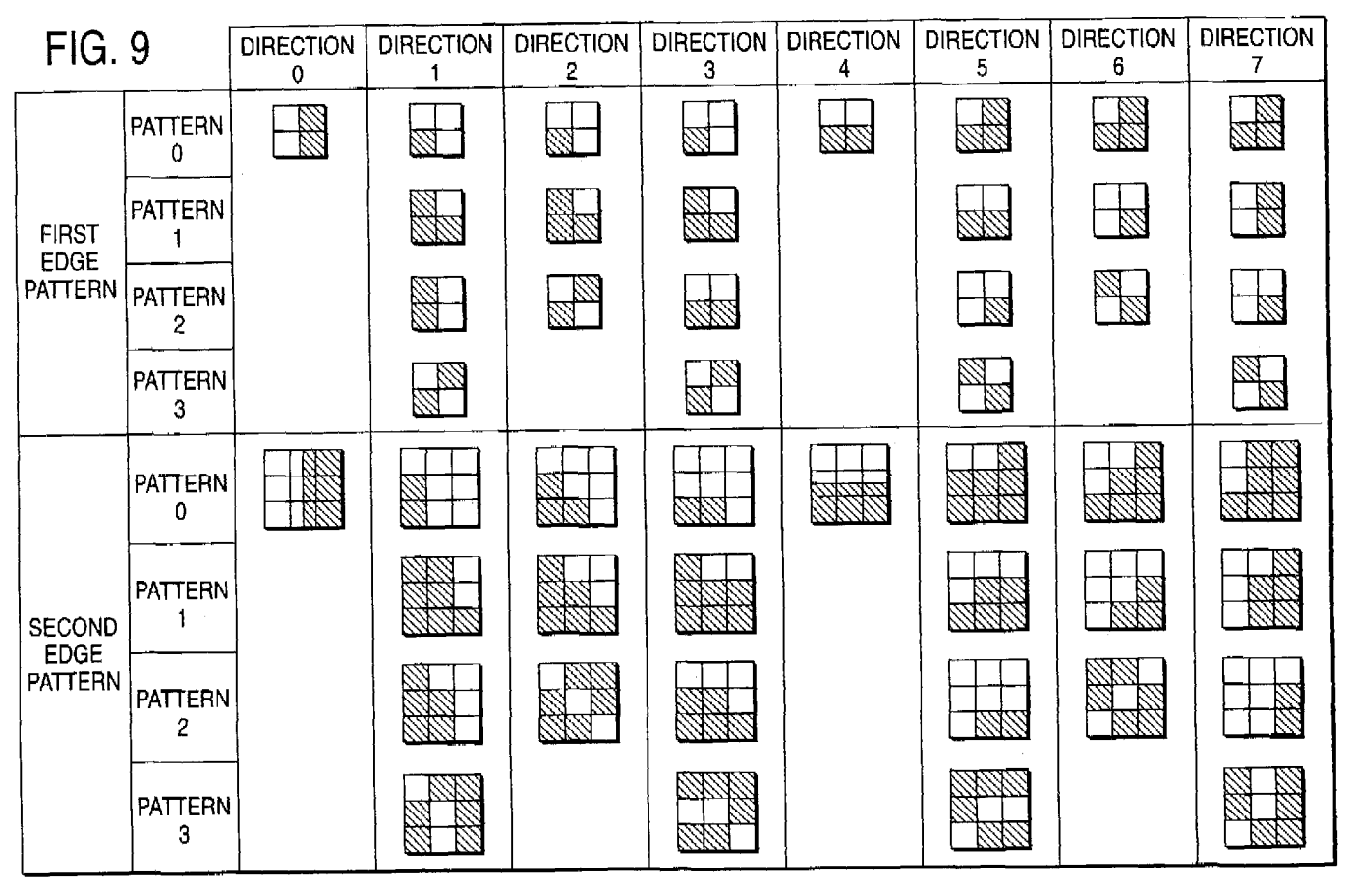

Pattern candidates corresponding to the edge pattern in the notable area are selected out of the edge pattern table shown in FIG. 9 in accordance with the estimated edge direction in the notable area (direction 1). In this case, four patterns of patterns 0 to 3 of the first edge pattern of direction 1 become candidates for the first edge pattern for the notable area shown in FIG. 4A.

Next, the edge pattern selection section 13 selects any one of patterns 0 to 3 as the first edge pattern for the notable area as described below.

FIGS. 10A to 10E are drawings to specifically describe a method of selecting one edge pattern from among the four edge pattern candidates for the notable area shown in FIG. 4A. To begin with, the first edge pattern candidates are converted into bit patterns as shown in FIG. 10B (white part is set to 0; otherwise 1). However, the edge pattern table shown in FIG. 9 may be previously converted into a bit pattern table and the bit pattern table may be stored in the storage section (not shown in FIG. 1), in which case the step can be skipped.

Next, according to the following expression (3), the average pixel value in the notable area (in FIG. 4A, 102) is calculated, the average value is subtracted from each pixel value of the notable area, and a pixel value pattern of the notable area is prepared based on the signs (FIG. 10C). Further, the pixel value pattern is converted into a bit pattern (FIG. 10D).

$$\text{Mean}=(a+b+c+d)/4$$

$$a\_\text{sign}=a-\text{Mean}$$

$$b\_\text{sign}=b-\text{Mean}$$

$$c\_\text{sign}=c-\text{Mean}$$

$$d\_\text{sign}=d-\text{Mean} \quad (3)$$

Next, pattern matching is performed between the bit pattern of each edge pattern candidate in FIG. 10B and the bit pattern of the notable area in FIG. 10D, and one first edge pattern for the notable area is selected (FIG. 10E). In this case, pattern 2 is selected as the first edge pattern for the notable area.

Figure 11:
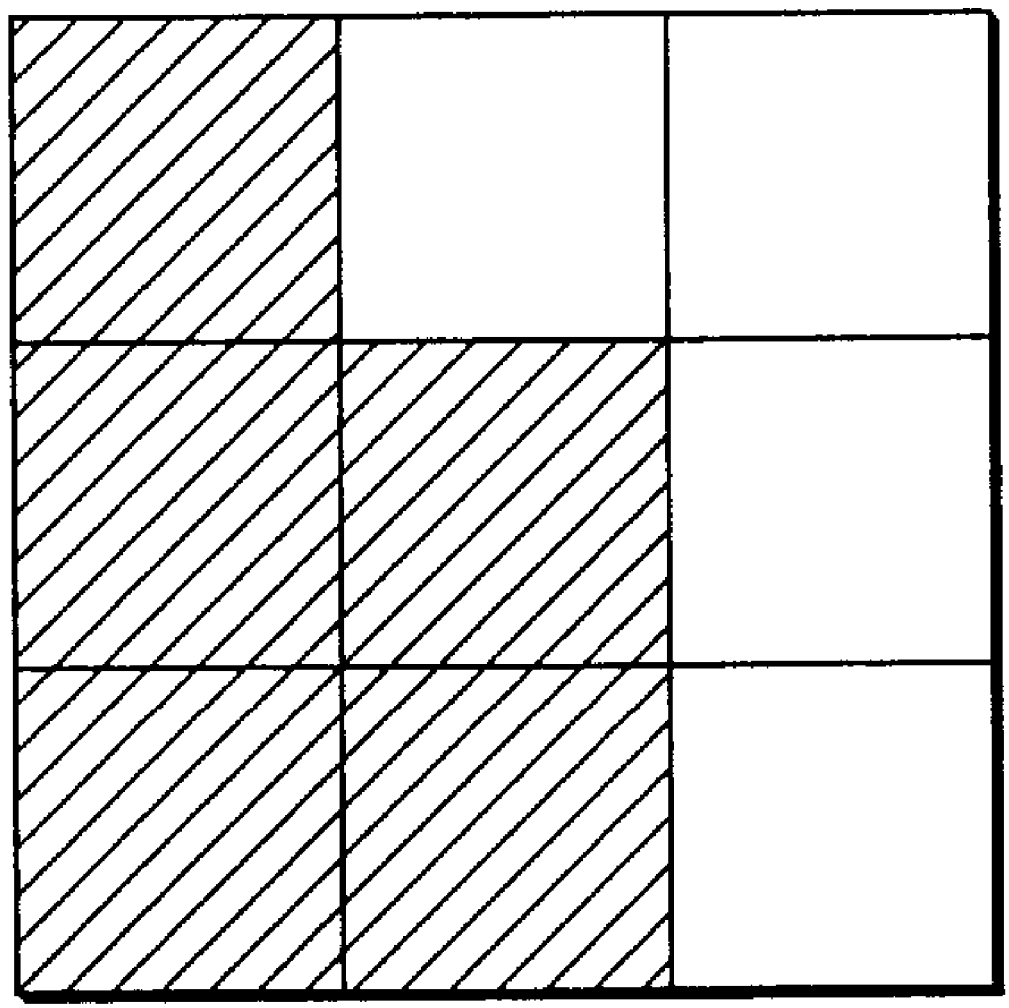
FIG. 11 is a drawing to show a second edge pattern in the notable area in FIG. 4.

When the first edge pattern is selected, last the second edge pattern provided corresponding to the first edge pattern is determined. In this case, the second edge pattern shown in FIG. 11 is selected. The second edge pattern is used for generating an enlarged image block for the notable area in the enlarged image block generation section 14 described later.

The first and second edge patterns are not limited to those shown in FIG. 9. For example, edge patterns different from those shown in FIG. 9 may be used in response to the type of input image data, and the number of first and second edge pattern candidates at each angle may be increased or decreased.

Next, the image enhancement section 12 will be discussed in detail. The image enhancement section 12 uses the kernel of elements and the size responsive to the enlargement ratio of enlargement processing in the enlargement processing section 1 to enhance the contrast of the image data of the notable area and its peripheral area in the image block extracted by the image block setting section 10 as shown in FIG. 3.

Figure 13:
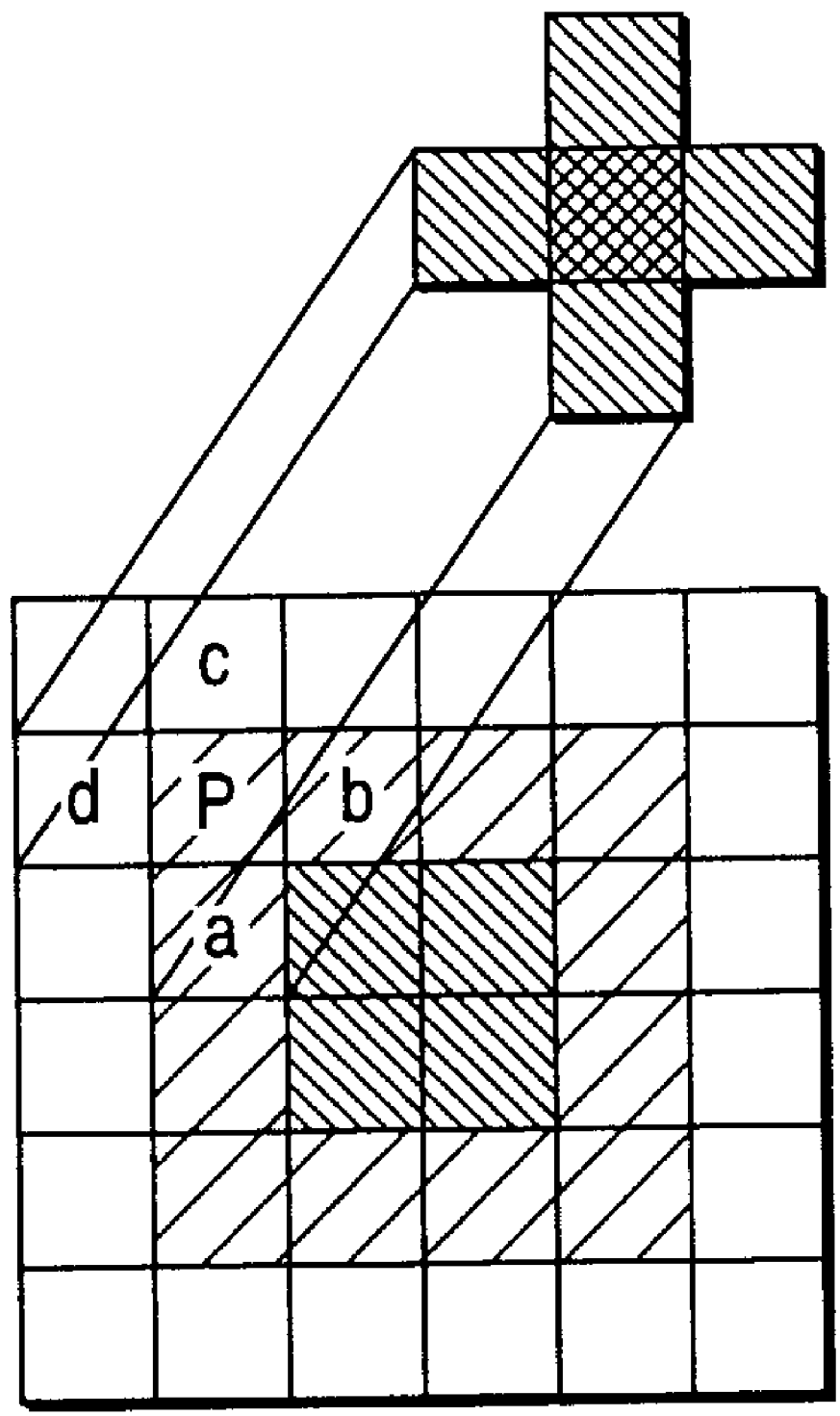
FIG. 13 is a drawing to show an example of enhancing pixel P with the enhancement kernel in FIG. 12A.

FIGS. 12A to 12C show specific examples of enhancement kernels used with the image enhancement section 12. FIG. 13 is a drawing to show how pixel P is enhanced using kernel 0 shown in FIG. 12A. In this case, pixel value P' of the pixel P is calculated according to the following expression (4):

$$\text{Notable pixel value } P'=1.60*P-0.15*(a+b+c+d) \quad (4)$$

(wherein a, b, c, d, and P denote pixel values of positions shown in FIG. 13.)

Figure 14:
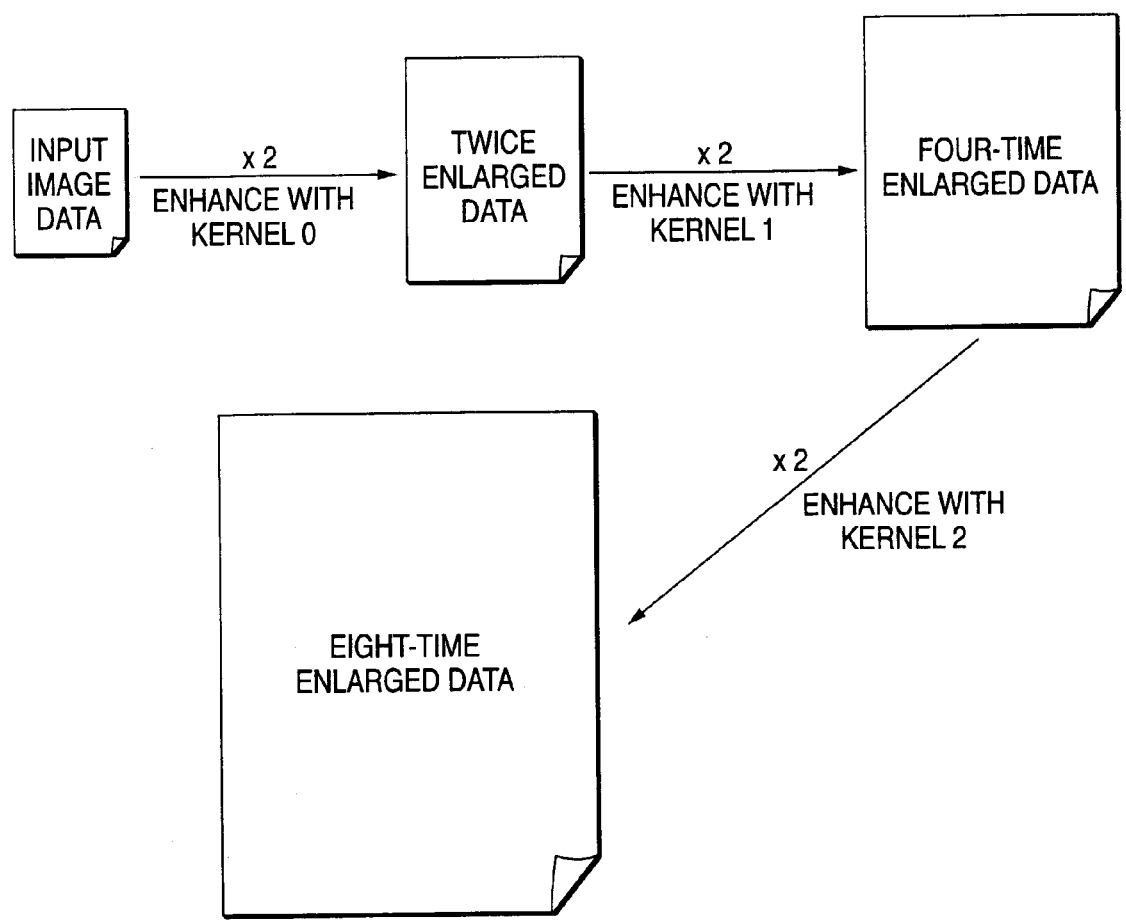
FIG. 14 is a drawing to describe contrast enhancement using the enhancement kernels to enlarge input image data eight times.

FIG. 14 shows an example of contrast enhancement using the enhancement kernels shown in FIGS. 12A to 12C to enlarge input image data eight times. First, to enlarge the input image data twice, kernel 0 shown in FIG. 12A is used to execute contrast enhancement of the input image data.

Next, to enlarge twice the input image data enlarged twice, kernel 1 shown in FIG. 12B is used to execute contrast enhancement of the input image data twice enlarged. Likewise, to enlarge the input image data eight times, kernel 2 shown in FIG. 12C is used to execute contrast enhancement of the input image data enlarged four times.

The kernels used for performing contrast enhancement are not limited to those shown in FIGS. 12A to 12C, and a kernel different from those shown in FIGS. 12A to 12C in elements and element-to-element distance may be used in response to the type or size of input image data.

Next, the enlarged image block generation section 14 will be discussed. The enlarged image block generation section 14 generates an enlarged image block for the notable area using the second edge pattern provided by the edge pattern selection section 13 and the pixel values subjected to contrast enhancement in the image enhancement section 12.

Figure 15:
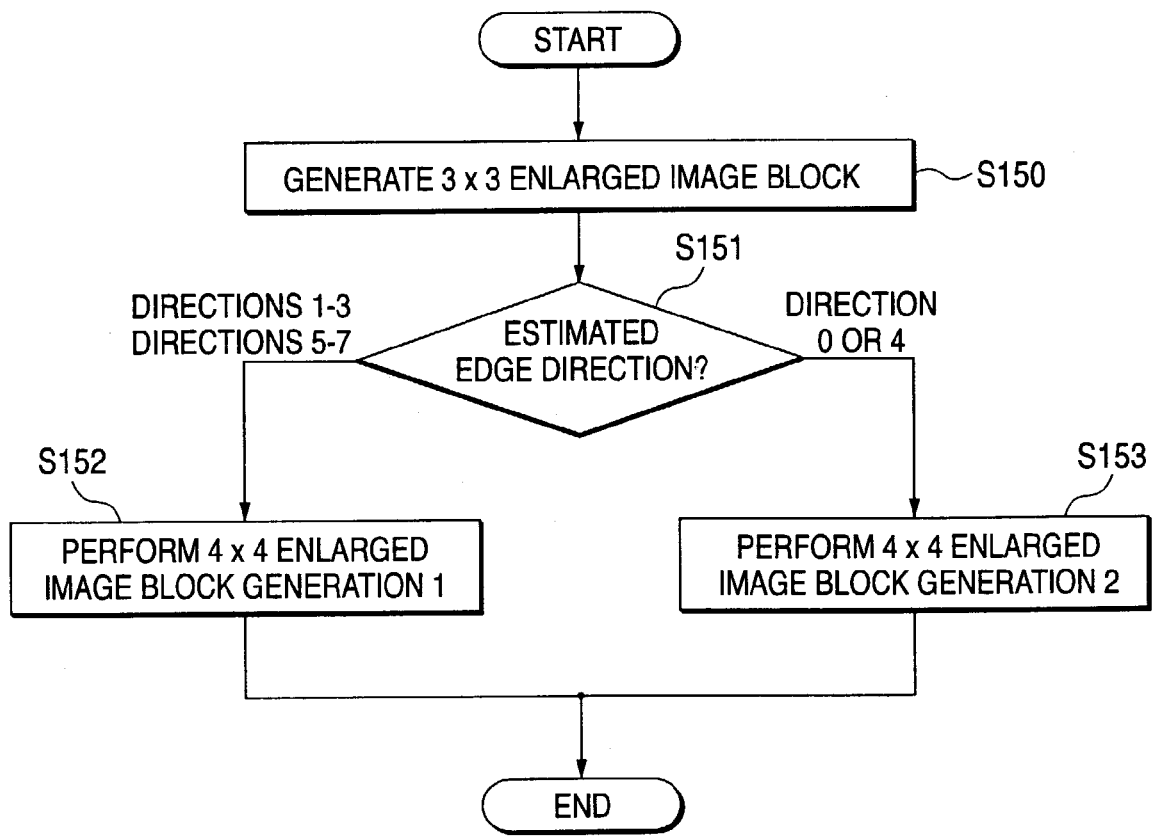
FIG. 15 is a flowchart to show a flow of enlarged image block generation processing of an enlarged image block generation section.

An example of a flow of enlarged image block generation processing of the enlarged image block generation section 14 will be discussed with reference to a flowchart of FIG. 15. To begin with, at step S150, a 3×3 enlarged image block is generated using the notable area subjected to contrast enhancement in the image enhancement section 12 and the second edge pattern selected by the edge pattern selection section 13, as shown in FIG. 16. The pixel values of the 3×3 enlarged image block are calculated according to expressions shown in FIG. 16. The pixel value calculation expressions are determined for each second edge pattern. FIG. 17 shows specific examples of the pixel value calculation expressions in other second edge patterns.

Next, at step S151, the edge direction in the notable area estimated by the edge direction estimation section 11 is determined. If the estimated edge direction is any of directions 1 to 3 or directions 5 to 7, the process is transferred to step S152; if the estimated edge direction is direction 0 or 4, the process is transferred to step S153.

At step S152 (when the estimated edge direction in the notable area is any of directions 1 to 3 or directions 5 to 7), a 4×4 enlarged image block is generated from the 3×3 enlarged image block generated at step S150.

Figure 18:
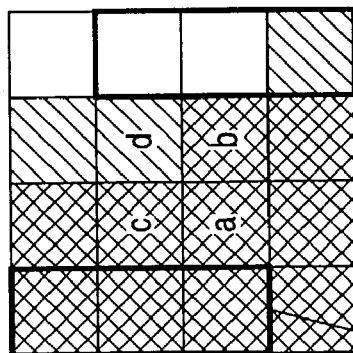
FIG. 18 is a drawing to show a specific example of 3×4 enlarged image block generation.

To begin with, as shown in FIG. 18, a 3×4 enlarged image block is generated using the 3×3 enlarged image block and reference pixels (r0 to r5) in the peripheral area subjected to contrast enhancement in the image enhancement section 12. The pixel values of the 3×4 enlarged image block are determined according to calculation expressions shown in FIG. 18. The reference pixels (r0 to r5) in the peripheral area are selected in accordance with the estimated edge direction in the notable area.

FIG. 19 shows specific examples of the reference pixels selected according to the estimated edge direction. Selection of the reference pixels is not limited to the selection examples of two patterns as shown in FIG. 19, and a larger number of reference pixel selection patterns may be provided in accordance with the estimated edge direction.

Figure 20:
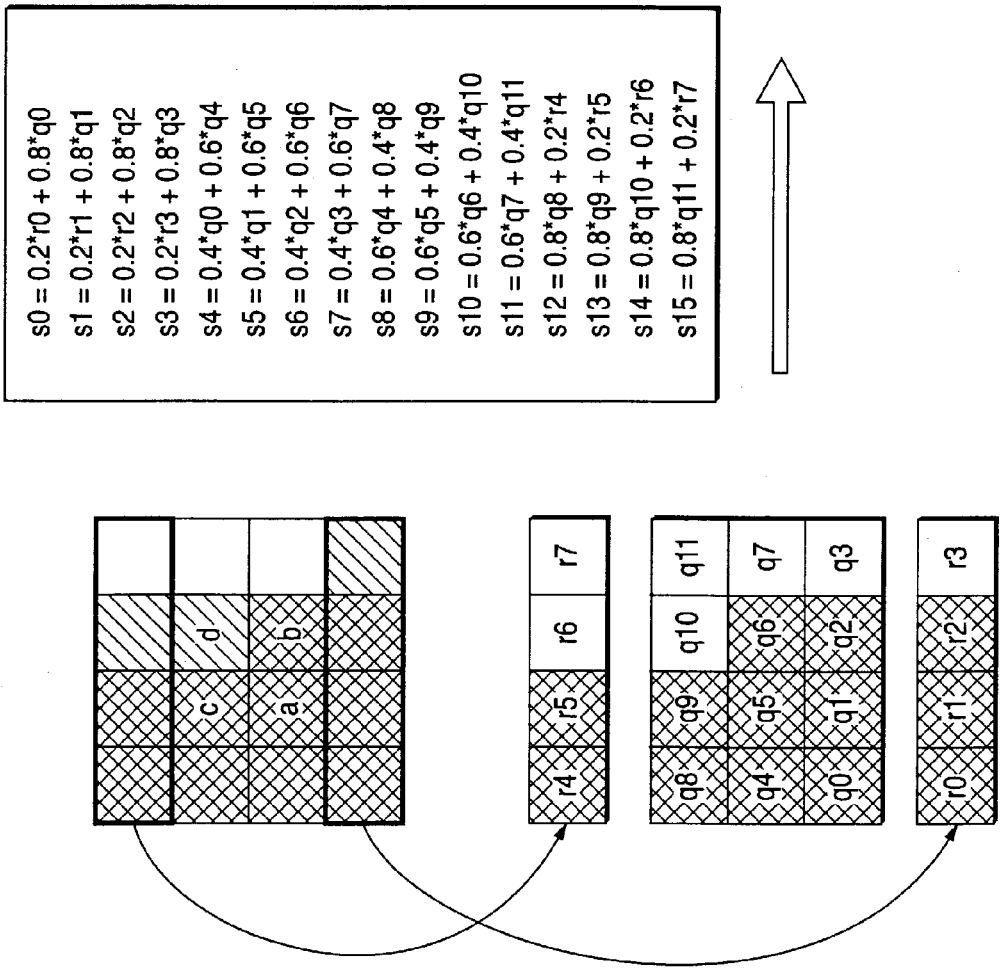
FIG. 20 is a drawing to show a specific example of 4×4 enlarged image block generation.

Next, as shown in FIG. 20, a 4×4 enlarged image block is generated using the 3×4 enlarged image block and reference pixels (r0 to r7) in the peripheral area subjected to contrast enhancement in the image enhancement section 12. The pixel values of the 4×4 enlarged image block are determined according to calculation expressions shown in FIG. 20.

In the 4×4 enlarged image block generation at step S152 described above, the processing flow of 3×3 block → 3×4 block → 4×4 block generation is shown, but a processing flow of 3×3 block → 4×3 block → 4×4 block generation may be adopted, in which case reference pixel selection is appropriately changed.

At step S153 (when the estimated edge direction in the notable area is direction 0 or 4), a 4×4 enlarged image block is generated from the 3×3 enlarged image block generated at step S150.

Figure 21:
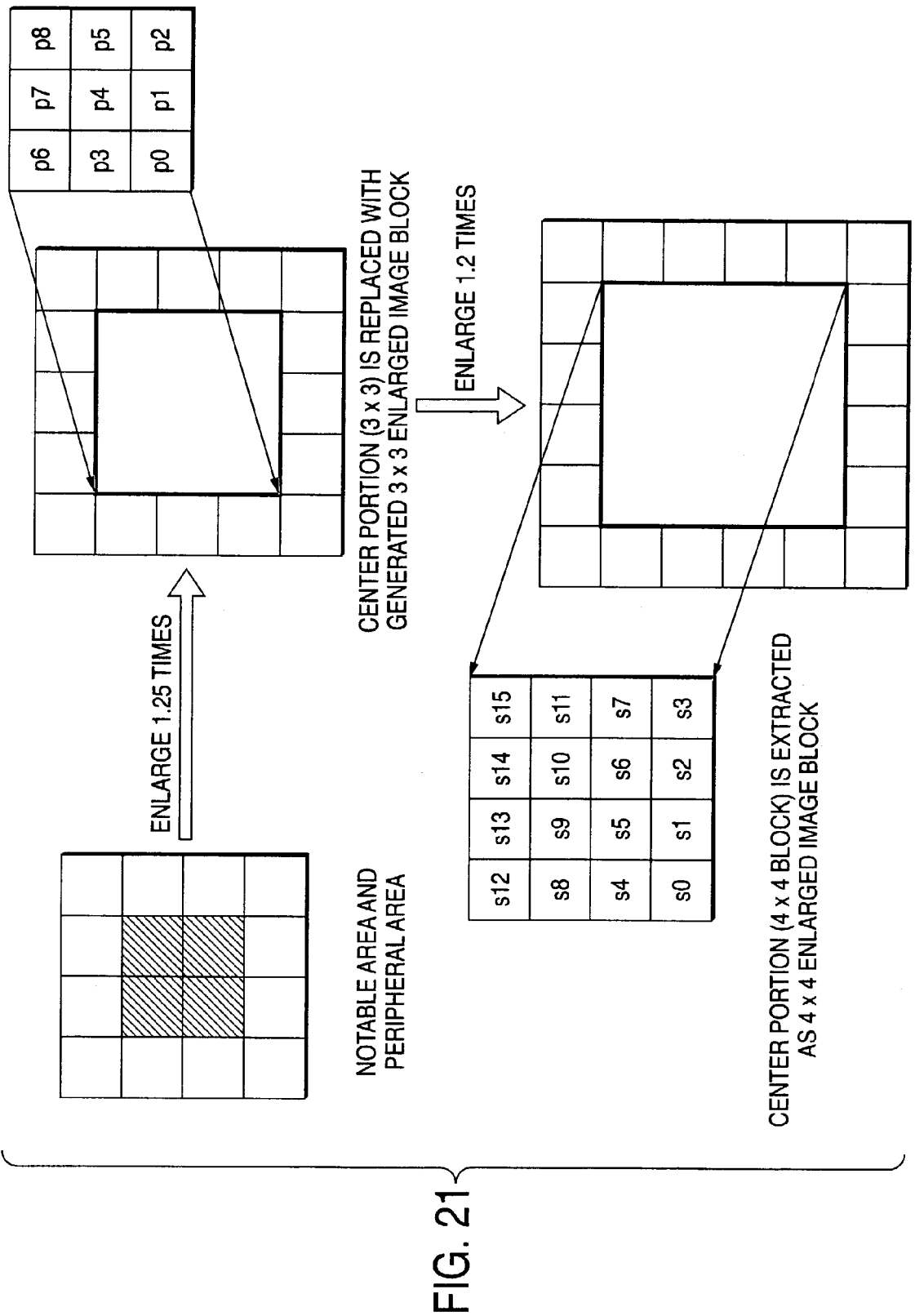
FIG. 21 is a drawing to show an example of 4×4 enlarged image block generation when estimated edge direction is direction 0 or 4.

FIG. 21 shows an outline of 4×4 enlarged image block generation processing at step S153. First, the notable area and peripheral area block (4×4) subjected to contrast enhancement in the image enhancement section 12 is enlarged 1.25 times. In this case, the enlargement technique may be linear enlargement or projection enlargement.

Next, the center portion of the provided 5×5 block (3×3 block) is replaced with the 3×3 enlarged image block generated at step S150 and further the resultant 5×5 block is enlarged 1.2 times. Also in this case, the enlargement technique may be linear enlargement or projection enlargement.

Figure 22:
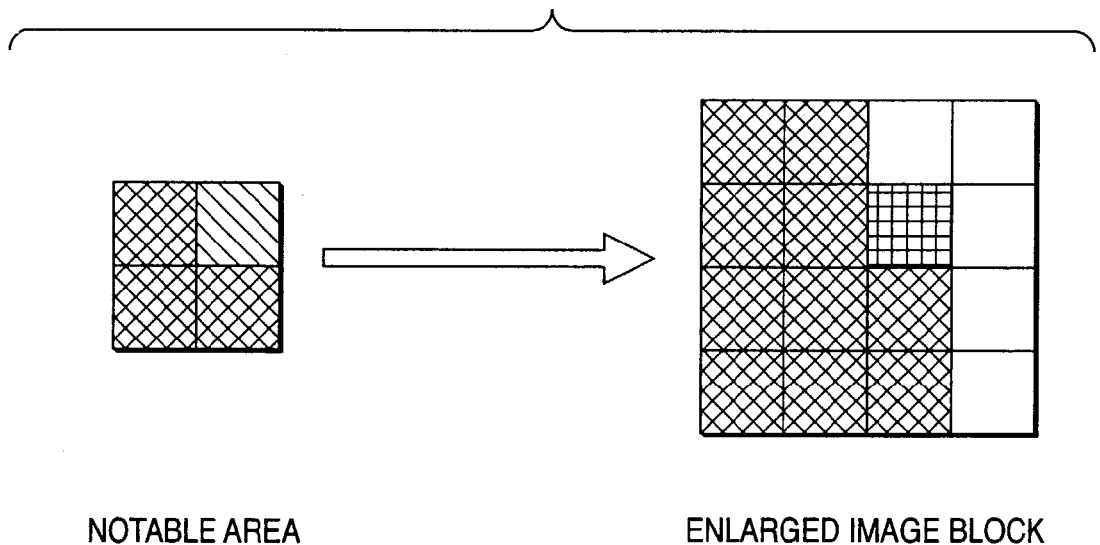
FIG. 22 is a drawing to show enlarged image block for notable area.

Last, the center portion of the provided 6×6 block (4×4 block) is extracted as a 4×4 enlarged image block for the notable area. As steps S150 to S153 are executed, the enlarged image block for the notable area, for example, as shown in FIG. 22 is generated.

Next, the image block placement section 15 will be discussed. The image block placement section 15 places the enlarged image blocks for the notable area generated by the enlarged image block generation section 14 in order according to a predetermined method.

Figure 23:
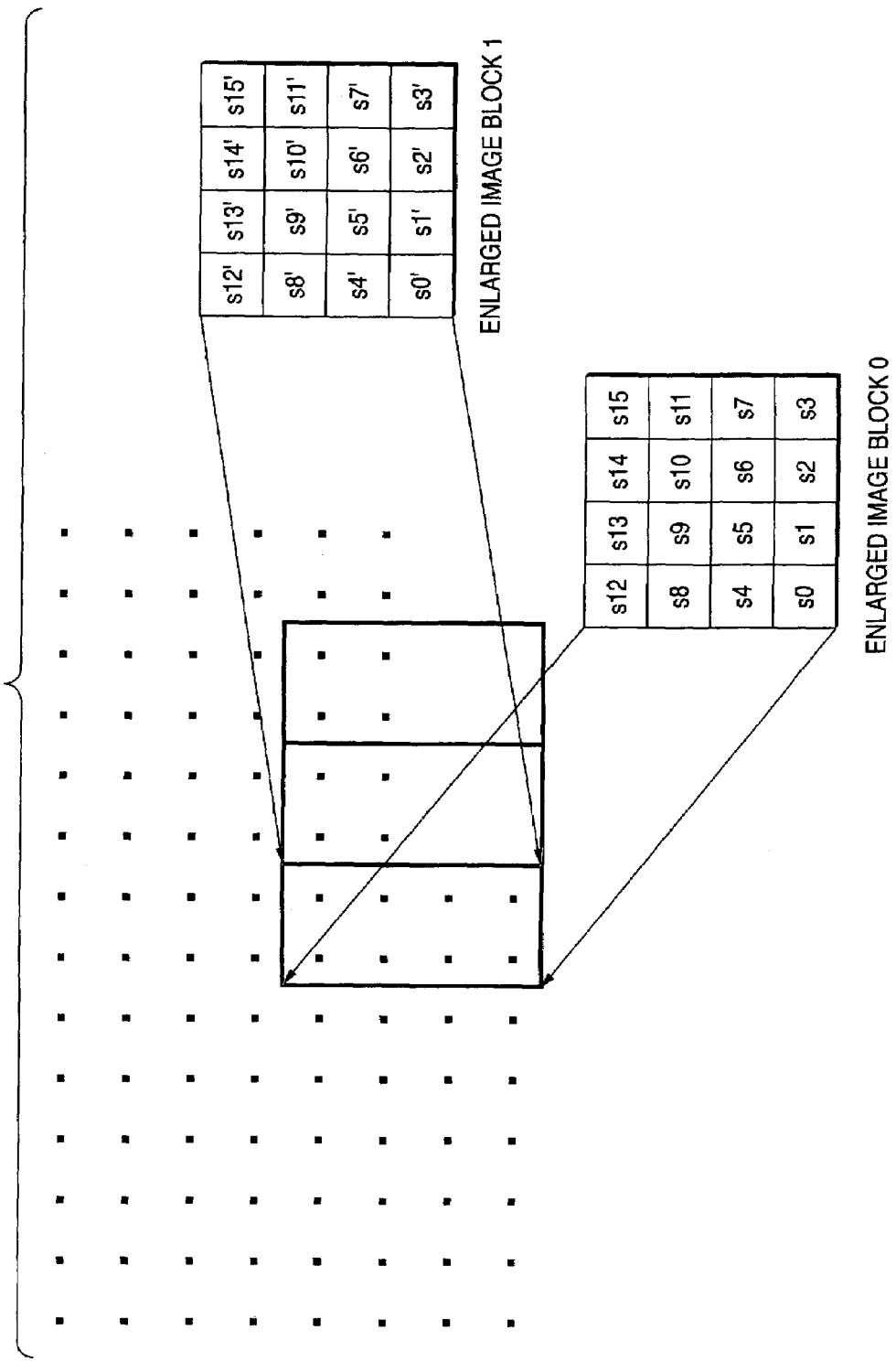
FIG. 23 is a drawing to show a specific example of 4×4 enlarged image block placement in an image block placement section.

FIG. 23 shows a specific example of placing the 4×4 enlarged image blocks generated by the enlarged image block generation section 14. In the example shown in FIG. 23, enlarged image blocks 0 and 1 generated in order are placed so that they overlap each other. Each overlapped pixel is placed in such a manner that the pixel value and the preceding pixel value are averaged.

To perform image enlargement processing by the image processing apparatus and the image processing method of the embodiment, the edge shape pattern corresponding to the edge direction can be selected only by executing simple pattern matching and an enlarged image is generated using the pixel values considering the edge direction based on the selected edge shape pattern, so that it is made possible to provide an enlarged image with occurrence of blurring and jaggies suppressed under small processing load.

The image processing method described above may be executed in a personal computer or a digital camera, as an image processing program or may be a form distributed via a communication line of the Internet, or recorded on a computer-readable record medium, such as a CD-ROM.

Such an image processing program can also be applied to the case where an input image is enlarged digitally in a machine for handling a digital image, such as a digital still camera, a digital video camera, a mobile telephone, or a PDA (personal data assistant).

As described above, in the invention, in image enlargement processing, a precise edge direction is detected and an enlarged image is generated from the pixel values responsive to the edge direction, so that it is made possible to accomplish high-quality image enlargement processing with image quality defects of blurring and jaggies suppressed under small processing load at high speed.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. An image processing apparatus for performing image enlargement processing, said image processing apparatus comprising:
    an edge direction estimation section for estimating edge direction information for a first image area containing a notable pixel;
    an edge pattern selection section for selecting an edge shape pattern corresponding to the first image area corresponding to an edge direction indicated by the edge direction information based on the edge direction information and a pixel value in the first image area;
    an image enhancement section for enhancing the pixel value of the first image area;
    an enlarged image area generation section for generating an enlarged image area by using the edge shape pattern selected by said edge pattern selection section and the pixel value of the first image area enhanced by said image enhancement means; and
    an image placement section for placing the enlarged image area generated by said enlarged image area generation section according to a predetermined method.

2. The image processing apparatus as claimed in claim 1, wherein
    said edge direction estimation section calculates each edge angle based on the pixel value difference for the first image area containing the notable pixel and an image area on the periphery of the first image area, and estimates the edge direction information in the first image area containing the notable pixel from the calculated edge angles.

3. The image processing apparatus as claimed in claim 1, wherein
    said edge direction estimation section selects the image area used for estimating the edge direction information in the first image area containing the notable pixel.

4. The image processing apparatus as claimed in claim 1, wherein
    the edge direction information estimated by said edge direction estimation section is normalized in a determined number of directions.

5. The image processing apparatus as claimed in claim 1, wherein
    said edge direction estimation section calculates edge strength information in the first image area.

6. The image processing apparatus as claimed in claim 5, wherein
    said edge direction estimation section selects a color space data piece from among color space data pieces in accordance with the edge strength information and estimates the edge direction information using the selected color space data piece.

7. The image processing apparatus as claimed in claim 1, wherein
    said edge pattern selection section selects the edge shape pattern from among a plurality of edge shape patterns for specific edge direction information.

8. The image processing apparatus as claimed in claim 1, wherein
    when two or more edge shape patterns are selectable for specific edge direction information, said edge pattern selection section converts the pixels in the first image area into a binary pattern and executes pattern matching between the binary pattern and each of the edge shape patterns to select the edge shape pattern.

9. The image processing apparatus as claimed in claim 1, wherein
said edge pattern selection section selects the edge shape pattern from among a plurality of edge shape patterns different in size corresponding to the first image area, each edge shape pattern being provided in a correspondence with different size.

10. The image processing apparatus as claimed in claim 1, wherein said image enhancement section selects a enhancement kernel in response an enlargement ratio from among a plurality of enhancement kernels different in kernel elements and element-to-element distance and applies the selected enhancement kernel to enhancing the pixel values of the first image area.

11. The image processing apparatus as claimed in claim 1, wherein
said enlarged image area generation section comprises first enlarged image area generation section and second enlarged image area generation section.

12. The image processing apparatus as claimed in claim 11, wherein
the first enlarged image area generation section enlarges the first image area to generate a first enlarged image area for each of the edge shape patterns by using the pixel value in the first image area enhanced by said image enhancement section or by using a value calculated using two or more pixel values in the first image area enhanced by said image enhancement section.

13. The image processing apparatus as claimed in claim 11, wherein
the second enlarged image area generation section comprises a plurality of enlargement unit that enlarges the first enlarged image area by using different process; and the second enlarged image area generation section selects a enlargement unit to use from among the plurality of enlargement unit in accordance with the edge direction information estimated by said edge direction estimation section.

14. The image processing apparatus as claimed in claim 13, wherein
one of the enlargement unit generates a second enlarged image area by predetermined calculation using the pixel value in the first enlarged image area and the pixel value in the periphery of the first image area enhanced by said image enhancement section.

15. The image processing apparatus as claimed in claim 13, wherein
one of the enlargement unit selects the pixel value in the periphery of the first image area in accordance with the edge direction information estimated by said edge direction estimation section.

16. The image processing apparatus as claimed in claim 13, wherein
one of the enlargement unit generates a second enlarged image area using a value resulting from converting the pixel value in the periphery of the first image area enhanced by said image enhancement section by predetermined calculation.

17. The image processing apparatus as claimed in claim 1, wherein
said image placement section places the enlarged image areas generated by said enlarged image area generation section sequentially so as to overlap the each enlarged image areas.

18. An image processing method for performing image enlargement processing, said image processing method comprising the steps of:
estimating edge direction information for a first image area containing a notable pixel;
selecting an edge shape pattern corresponding to the first image area corresponding to an edge direction indicated by the edge direction information based on the edge direction information and a pixel value in the first image area;
enhancing the pixel value of the first image area;
generating an enlarged image area by using the edge shape pattern and the enhanced pixel value of the first image area; and
placing the enlarged image area according to a predetermined method.

19. A computer-readable record medium recording an image processing program comprising the steps of:
estimating edge direction information for a first image area containing a notable pixel;
selecting an edge shape pattern corresponding to the first image area corresponding to an edge direction indicated by the edge direction information based on the edge direction information and a pixel value in the first image area;
enhancing the pixel value of the first image area;
generating an enlarged image area by using the edge shape pattern and the enhanced pixel value of the first image area; and
placing the enlarged image area according to a predetermined method.

* * * * *